July 21, 1959 — S. B. TOPF — 2,895,400
GRAIN STORAGE BAG
Filed May 9, 1955 — 5 Sheets-Sheet 1
FIG. I
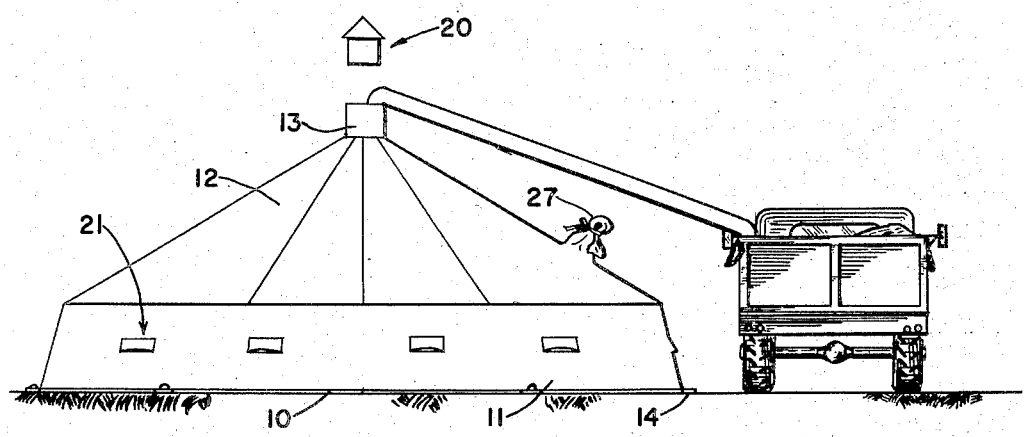
FIG. 2
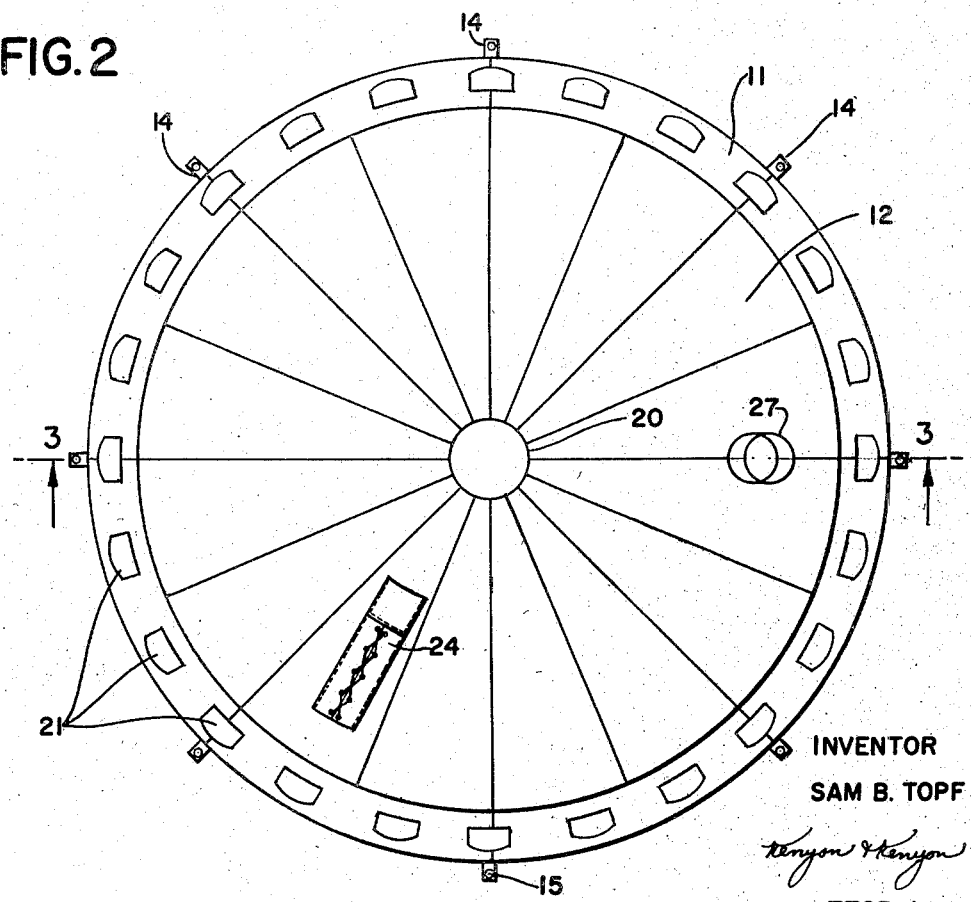
INVENTOR
SAM B. TOPF
Kenyon & Kenyon
ATTORNEYS

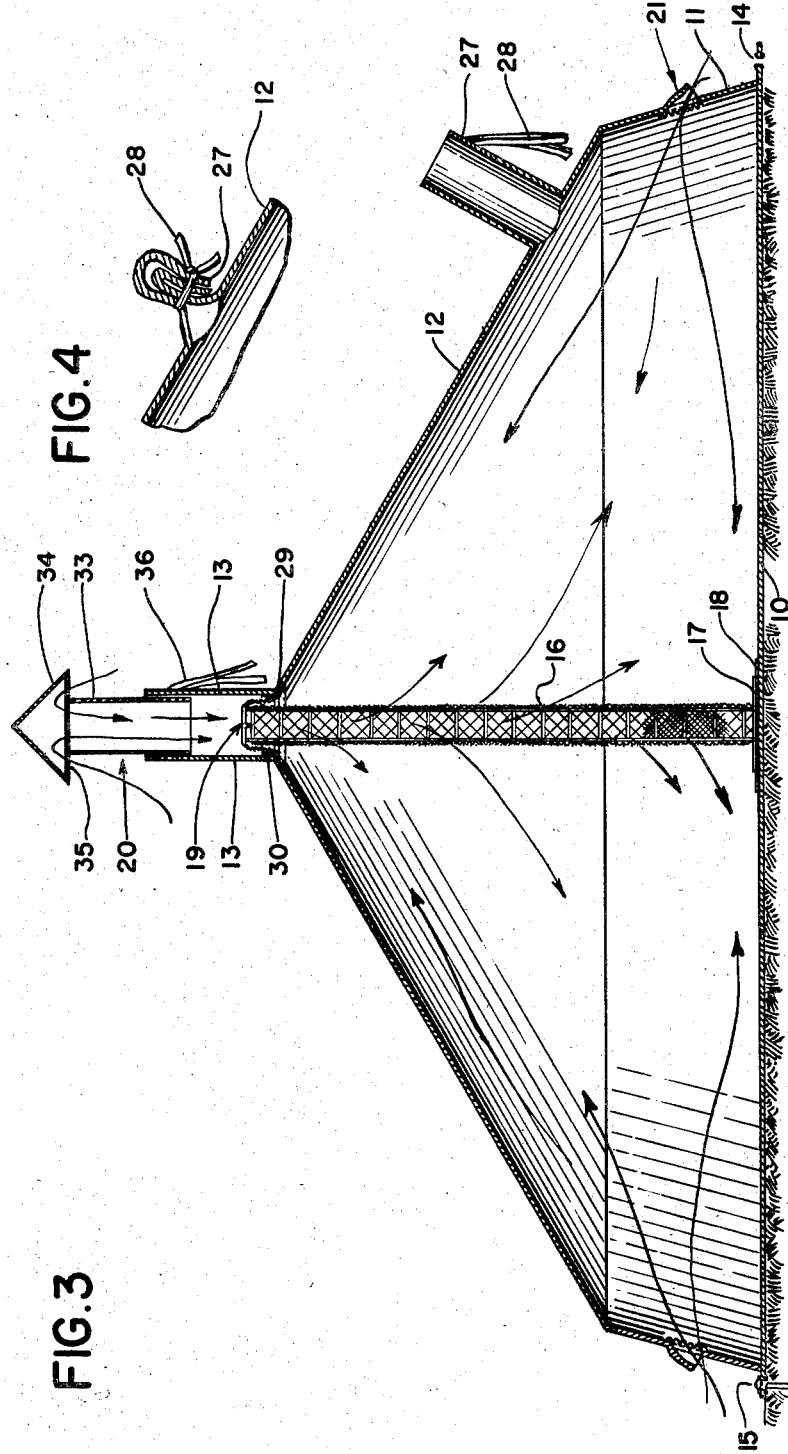

July 21, 1959   S. B. TOPF   2,895,400
GRAIN STORAGE BAG

Filed May 9, 1955   5 Sheets-Sheet 3

INVENTOR
SAM B. TOPF

ATTORNEYS

July 21, 1959  S. B. TOPF  2,895,400
GRAIN STORAGE BAG

Filed May 9, 1955  5 Sheets-Sheet 4

INVENTOR
SAM B. TOPF

ATTORNEYS

July 21, 1959 — S. B. TOPF — 2,895,400
GRAIN STORAGE BAG
Filed May 9, 1955 — 5 Sheets-Sheet 5
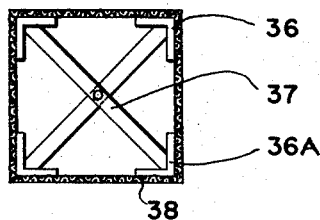
FIG.10
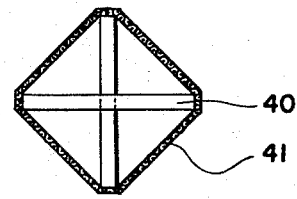
FIG.11
FIG.12
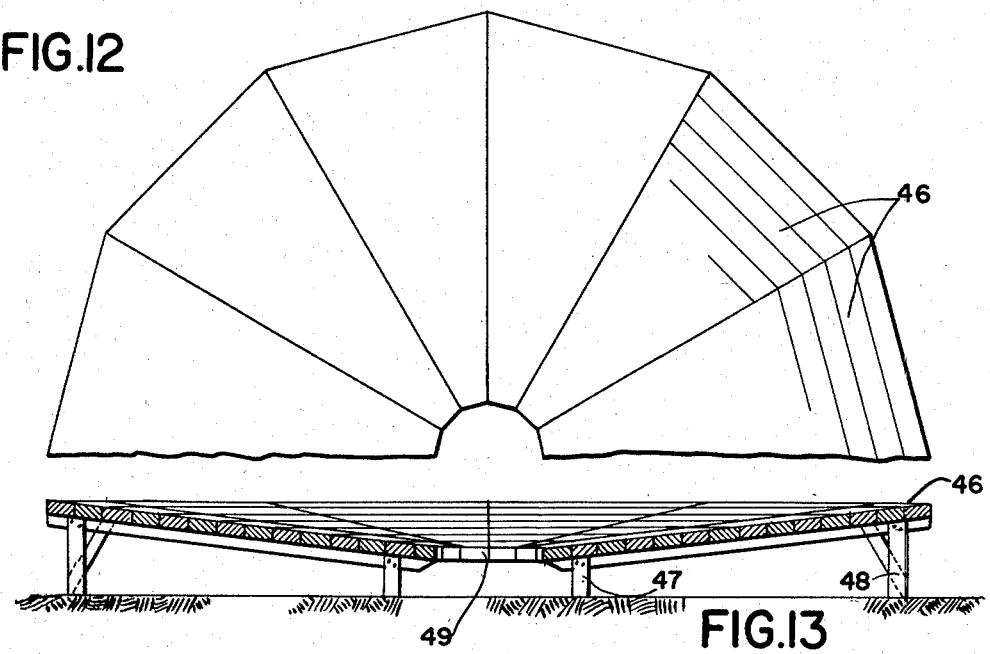
FIG.13
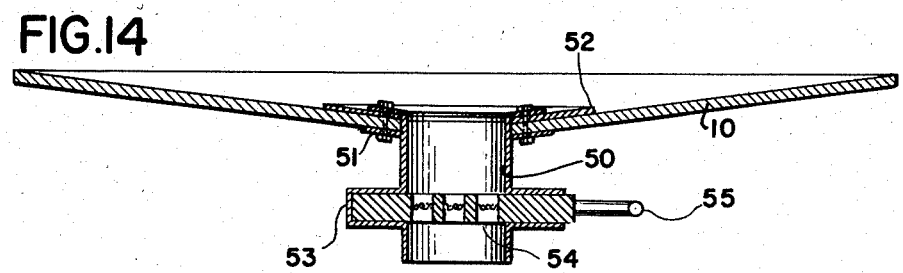
FIG.14
FIG.15
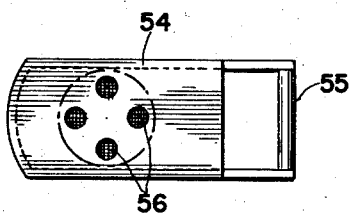
INVENTOR
SAM B. TOPF
ATTORNEYS

United States Patent Office 2,895,400
Patented July 21, 1959

2,895,400

GRAIN STORAGE BAG

Sam B. Topf, Cambria Heights, N.Y., assignor to Concord Supplies and Equipment Corporation, New York, N.Y., a corporation of New York Application May 9, 1955, Serial No. 507,086

10 Claims. (Cl. 98—55)

The present invention relates generally to granaries, and more particularly to a portable grain storage bag which may readily be erected or dismantled and which affords effective and long-term protection against the harmful effects of moisture, heat, rodents and other hazards to which stored grain is susceptible.

The huge surplus of grain produced in recent years has severely taxed existing storage facilities and created a serious problem of national scope. Conventional silo structures fabricated of metal, wood or concrete have been subjected to exceptional loads. Due to structural defects resulting in spilling, slow leakage and dumping, substantial quantities of grain have been lost or irreparably damaged.

It has also become necessary to hold a great amount of harvested grain in comparatively small granaries or bins, either on farms as collateral for loans, or on commercial sites under the supervision of Government agencies dealing with surplus production. The earth of adequate storage facilities has at times dictated the use of makeshift farm structures never intended for grain storage and poorly adapted for this purpose. In some instances, the soil has been rendered sterile and the grain piled directly thereon, the sole protection against the elements being a tarpaulin cover. Large losses have been experienced by reason of such inadequate storage.

As is well known, the major factors leading to grain deterioration are heat, moisture, insects and rodents. An accumulation of damp grain within a filled bin acts as a favorable environment for mold and insect activity, as well as destructive fermentation. Moisture hazards in a bulk of dry grain are aggravated if additional water enters the storage as a consequence of leakage in the roof or walls.

Heat grains in the bulk may arise due to solar radiation or internal respiration and natural germination of the grain. An increase of heat in the bulk of grain is often conducive to the deleterious activity of microorganisms and insects. Damage wrought by stored-grain pests and rodents is not restricted to their feeding on sound kernels, for the odors created by insects and rodents is highly offensive and commercially objectionable.

Attempts heretofore made to meet the mounting pressure for storage facilities by the use of temporary storage bins and bags have not been commercially successful, for such devices were lacking in the requisite grain safety characteristics. For example, the use of conventional fabrics such as duck as a wall material for a storage bag structure affords little protection against rodents which are able to bore through such fabrics. Moreover, it is not sufficient merely to provide a secure storage space since the proper design of a storage facility must take into account job-safety and convenience when moving grain into and out of storage. The design must also expedite inspection and servicing of the grain, such as drying and fumigation.

In view of the foregoing, it is the principal object of this invention to provide a portable grain storage device having superior grain-safety and job-safety characteristics. A significant feature of the invention resides in the fact that the storage device may be quickly and easily erected for immediate use, or dismantled, folded and packed away in a confined space for future use.

More particularly, it is an object of the invention to provide a grain storage bag, which is of exceptional structural strength, waterproof, rodent repellent and adequately vented. A bag in accordance with the invention is suitable not only for the storage of grain but may be similarly employed for all types of feed, seed, corn, etc.

Still another object of the invention is to provide a storage bag of the above-described type which is adapted to minimize heat grain of the bulk of external or internal origin, whether due to solar radiation or internally-generated heat.

A further object of the invention is to provide a grain bag having a generally conical form whose erection is carried out by the use of a single supporting post. A salient feature of the invention resides in the use of a resilient coupling between the top of the post and the apex of the bag to accommodate variations in the height of the bag. A further feature of the invention lies in the use of a hollow supporting post to facilitate the proper ventilation of the grain pile.

It is another object of the invention to provide a generally conical storage bag having a slope corresponding substantially to the angle of repose of the grain pile, thereby minimizing internal stresses on the bag.

Also an object of the invention is to provide a platform to facilitate the unloading of a bag having a central floor outlet.

Yet another object of the invention is to provide a grain storage bag which may be manufactured and sold at reasonable cost.

For a better understanding of the invention, as well as other objects and further features thereof, reference is made to the following detailed description thereof to be read in conjunction with the accompanying drawing wherein like elements in the several views are identified by the same reference numerals.

In the drawing:

Fig. 1 is an elevational view of a grain storage bag, in accordance with the invention, in the process of being loaded.

Fig. 2 is a top plan view of said bag.

Fig. 3 is a sectional view of the bag taken through the vertical plane along lines 3—3 in Fig. 2.

Fig. 4 is a detail showing the snout of the bag, as it appears when closed.

Fig. 10 is a sectional view of the post taken through lines 10—10 in Fig. 8.

Fig. 11 is a modification of the post structure.

Fig. 12 is a plan view of a wooden stand for supporting a modified form of the bag.

Fig. 13 is a sectional side view of the stand.

Fig. 14 is a view, in section, of a modified form of floor structure including a gate-controlled outlet.

Fig. 15 is a plan view of the gate.

Figure 5:
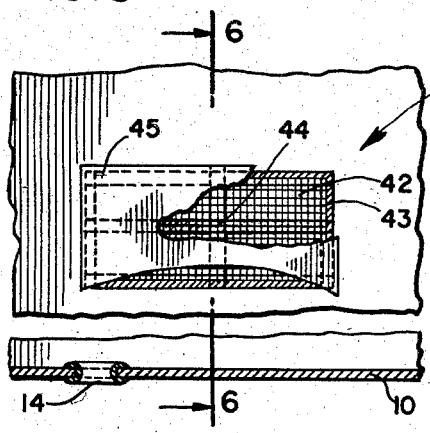
Fig. 5 is a detail showing one of the side vents of the bag.

Referring now to the drawings, and more particularly to Figs. 1 to 9, a preferred embodiment of a flexible fabric bag in accordance with the invention is mainly comprised of a floor portion 10 having a circular configuration, an upwardly tapered gusset portion 11, sewed or otherwise attached at its lower edge to the periphery of floor 10 and a roof portion 12 having a truncated-pyramidal shape. The base of roof 12 is secured to the upper edge of the gusset and the mouth of the roof is secured to a cylindrical chimney 13 extending upwardly therefrom. Thus the bag is composed of connected floor, gusset and roof portions which are integral to avoid entrance of insects and animals.

As best seen in Fig. 2, roof 12 is constituted by fifteen identical sections having a generally triangular shape, whereas gussett 11 is made up of eight trapezoidal sections sewed together at their short sides to form a frusto-pyramid. The roof sections are sewed together at their sides to form radial seams, the base of the sections being sewed to the upper edge of gusset 11 to form a continuous seam.

Floor 10, gusset 11, roof 12 and chimney 13 are all fabricated of the same material preferably formed of a lightweight fabric woven from a synthetic fiber and strengthened by a flexible coating of vinyl, neoprene or other synthetic plastic. The base fabric may be constituted by nylon, orlon, fiber glass, dacron, dynel or any of the other non-organic synthetic materials which do not appear in nature and which are resistant to molds and micro-organisms.

Preferably the base fabric is coated on both sides with a vinyl copolymer resin such as "Geon," since this plastic possesses excellent toughness, flexibility, durability and is resistant to attack by chemicals, such as fertilizer salts. A synthetic base fabric so coated is mildew and rot resistant, impervious to water and will not deteriorate appreciably even after prolonged exposure in or around a fertile, damp soil. Because of the greater duty to which it is subjected, the coatings on floor 10 are made relatively heavy. The floor for example may be triple coated with vinyl.

Evenly dispersed in the vinyl coatings on the base fabric is a rodent-repellent and pesticide whose composition is compatible with the vinyl. Preferably the repellent is constituted by zinc dimethyl-dithiocarbonate-cyclohexylamine complex, such as is disclosed in U.S. Patent No. 2,588,428. The repellent power may be mixed with the vinyl powder in predetermined proportions. Since rodent penetration is potentially a far greater source of damage to the basic fabric than rot and other deteriorating conditions, the inclusion of the repellent in the vinyl coating results in an appreciable prolongation in the life of the material and shields the stored grain from rodent attack. One may therefore dispense with the conventional rodent guards or barriers which surround grain bins.

In order to minimize heat gain, the exposed surface of the bag material is made extremely light in color to reflect solar radiation, whereas the interior surface is darkened to absorb internally-generated heat from the grain pile. This may be accomplished on the outer surface by incorporating pulverized silver or aluminum in the outer vinyl coating, or by applying a separate reflective coating thereon. The interior is darkened by dispersing black pigmentation in the vinyl coating therefor.

The sections of the bag structure are sewed together with a thread which not only has great wear and shock-resistance but is also substantially impervious to the effects of atmosphere and ultra-violet radiation. These characteristics are important because of the exposed position of the threads. To meet these requirements, a synthetic thread such as bonded orlon monocord is best suited for the seams. It is to be understood, however, that the sections may be interconnected by other means, such as by heat sealing or adhesion.

Projecting outwardly from the periphery of floor 10 at equi-spaced positions about the bag are a plurality of tabs 14. These tabs are provided with eyelets through which stakes 15 may be driven into the soil so as to anchor the bag firmly thereto. The sole support for the bag is provided by a central column or post 16, whose lower end rests on a wooden plate 17, which in turn lies upon a rectangular layer 18 of fabric material which is sewed to floor 10 to reinforce same at its point of greatest stress. The extra layer 18 also serves to locate the center position of the floor, thereby expediting the erection of the post. The structure of the post will be considered in greater detail hereinafter.

The upper end of post 16 is insertable within a resiliently supported socket, generally designated by numeral 19. Socket 19 is disposed in the lower portion of chimney 13 and is coaxial therewith. Insertable within chimney 13 is a metal ventilating cap 20 which is removable to permit filling of the bag.

Formed in gusset 11 and disposed circumferentially thereabout at equally spaced positions are a plurality of side vents, generally designated by numeral 21. Extending down substantially the full length of one section of the roof 12 is a zippered opening 22 adapted to admit an individual into the bag during the erection or dismantling thereof. This opening may also be used to unload the bag contents. As shown separately in Fig. 7, a top flap 23 and a pair of side flaps 24 and 25 are provided to close in the zipper so as to protect it from water run-off. The flaps are tied together by suitable lacing 26 threaded through eyelets in the side flaps, the top flap being placed under the side flap. Projecting laterally from roof 12 adjacent the juncture of the roof and gusset 11 is a cylindrical outlet or snout 27. As shown separately in Fig. 4, when not in use the snout may be sealed by means of straps 28. Snout 27 permits testing or sampling of the grain contents of the bag, or the complete emptying thereof by means of suitable suction or conveyor apparatus.

Figure 8:
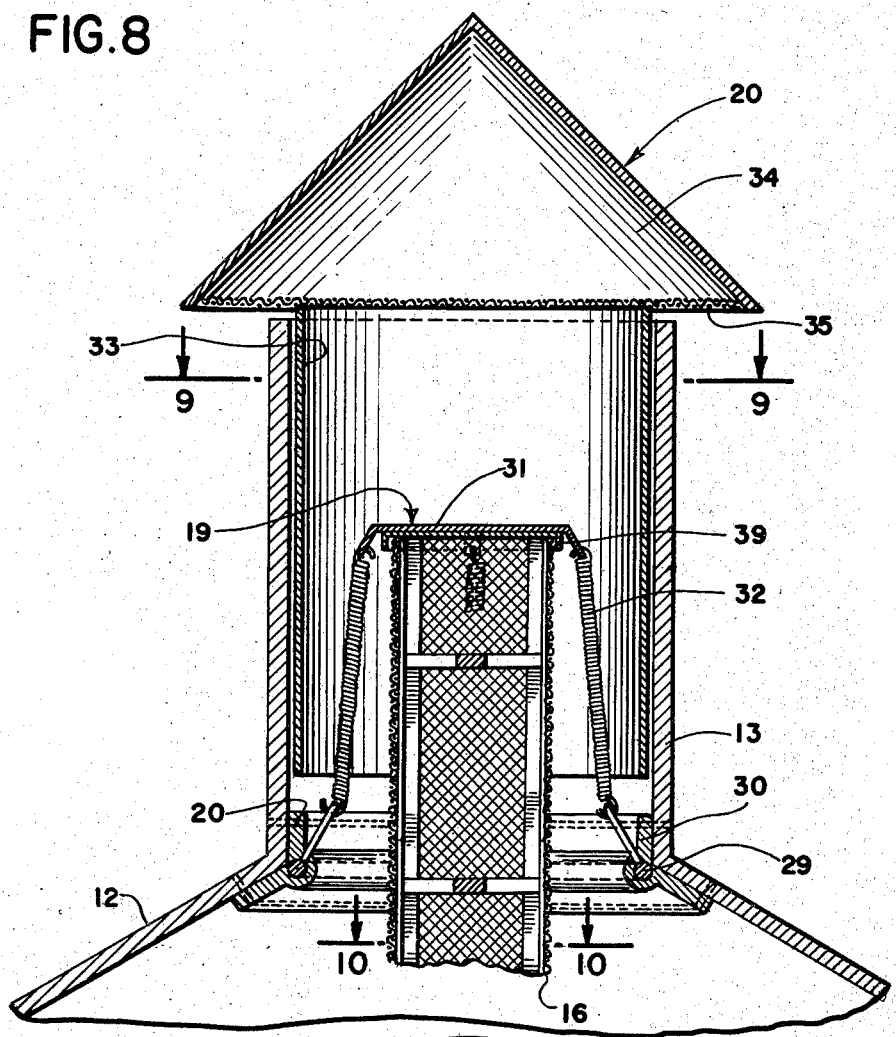
Fig. 8 is a detail showing the resilient socket support for the center post as well as the ventilation cap received within the chimney of the bag.
Figure 9:
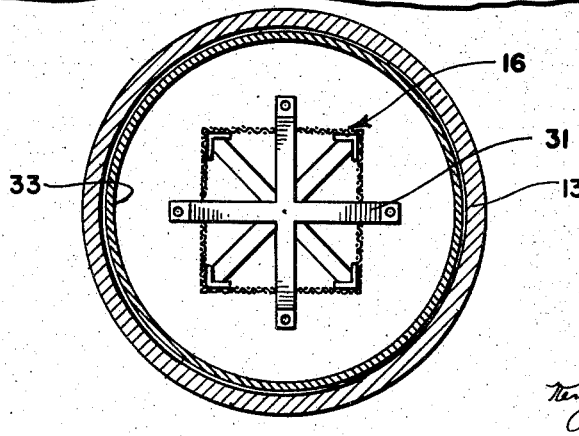
Fig. 9 shows in plan view the socket for the upper end of the support.

As best seen in Fig. 8, concentrically disposed within chimney 13 at the lower end thereof is a reinforcing ring 29, the ring being secured in place by an annular fabric band 30 which overlies the ring. The upper and lower edges of band 30 are sewed to the wall of the chimney. The resilient socket 19 for the center post 16 is constituted by a metal cross piece 31 whose four extremities are bent downwardly and are connected by suitable loops to helical springs 32, the ends of the springs being linked to the ring 29. Since the height of the bag will vary somewhat depending on the weight of the load contained therein, the resilient socket prevents excessive strain on the chimney and on the center post 16 and on the bag material itself.

The ventilating cap 20 is constituted by a metal sleeve 33 which is telescoped within chimney 13 and a conical dome 34 which is attached at its base to the upper end of the sleeve by a wire mesh 35. To tighten the cap onto the chimney, straps 36 are provided to encircle the chimney. In order to permit air or fumigating gas to be formed into the grain pile, the post 16 which extends through the vertical axis of the pile is preferably of hollow core construction.

As shown separately in Fig. 10, the post is constituted by four vertical angle bars 36A, which are positioned at the corners of a square, the bars being held in position by cross-struts 37 or similar means to form a hollow column. A wire mesh 38 surrounds the four bars to impede grain from entering the interior of the hollow column so formed.

A removable closure member 39 is provided at the upper end of the post 16 as a baffle preventing grain from falling into the post when filling the bag. Closure member 39 may form part of socket 19. Alternatively, as shown in Fig. 11, the post may be constituted by a cruciform support 40, surrounded by a wire mesh 41, the support 40 being formed by cross pieces secured together at their point of intersection. Obviously, the gauge of the mesh must be such as to block the entry of grain particles. Plastic screening may also be used for this purpose.

As indicated by the arrows in Fig. 3, air entering the side vents 21 will flow inwardly into the interior of the grain pile and upwardly towards the chimney 13 through the center post 16. In the event it is desired to fumigate the bulk, the flaps on the side vent may be closed and fumigating gas introduced into the bulk through the center post. In a similar manner heated air may be introduced through the center post to dry the grain in the bulk. To further enhance ventilation within the bulk, tubes formed of helically wound metal and surrounded by wire mesh may be extended between the side vents and the post to provide additional ventilating passages.

Figure 6:
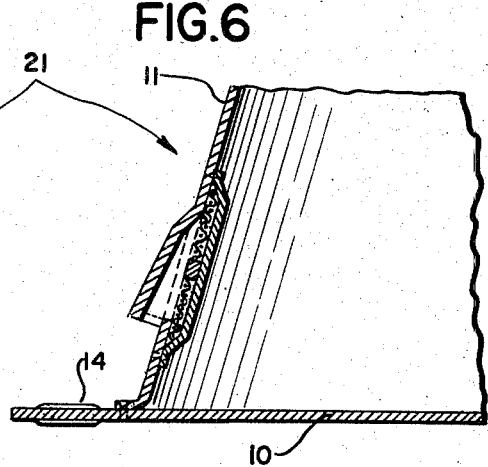
Fig. 6 is a section taken through the lines 6—6 in Fig. 5.
Figure 7:
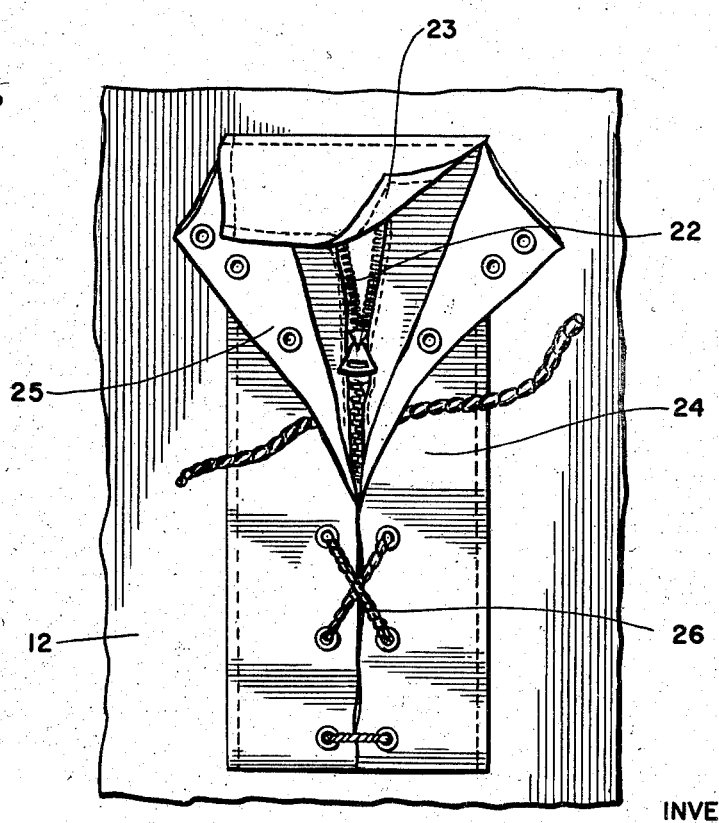
Fig. 7 is a detail showing the zipper and flap arrangement of the bag.

As best seen in Figs. 5 and 6, the side vents 21 are formed by a rectangular wire screen 42 whose edges are secured to the edges of the vent opening by a webbing frame 43. In additional, a cross-webbing 44 is provided to reinforce the vent. The webbing may be formed of the same vinyl coated fabric as the bag. To shield the vent from water and to provide an air duct therefor, a rectangular sheet 45 of coated fabric is placed over the opening and sewed at its upper side and at either end to the corresponding edges of the opening. Sheet 45 is bellied outwardly to form an air scoop.

To fill the bag, the vent cap 13 is first removed, and the grain then introduced into the chimney by any suitable screw or blower conveyor, as shown in Fig. 1. As the grain fills the bag, it will assume an angle of repose which depends on the particle size, the density, the roughness and other factors will determine this angle. It has been found that the angle of repose for various types of grain, corn, etc., lies in the range of approximately 27 to 31°. Accordingly, to minimize grain weight stresses on the bag, the conical roof 12 is designed so that its slope is about 35° and is therefore slightly greater than the average angle of repose for the contents stored therein so as to lend slight tautness to the roof. Thus wrinkles are eliminated and also the possibility of water pockets which may result in the absence of all tension. As pointed out previously, the design of the gusset 11 is such that it is inwardly tapered. As the bag is being filled with grain, the gusset tends to assume a more vertical position when the bag is loaded. This is of advantage for it thereby serves to hold the roof taut and to prevent wrinkles from forming therein which would result in water pockets. Moreover, the more vertical position assumed by the gusset when loaded will provide a fast run-off and avoid water seepage through the vent screen. Furthermore, the upward taper of gusset 11 causes the bag to rise symmetrically relative to the vertical post without any lean as the bag is filled.

In erecting the bag, the following procedure is involved. The bag is placed on a relatively level area of ground, and stakes are driven into the tabs to anchor the bag. The operator then enters the bag by opening the zipper and he raises the supporting post 16 so that its upper end engages the resilient socket 19 while its lower end rests on the reinforced area in the center of the floor. It will be apparent that these steps may be carried out quickly and without difficulty by a single individual. To dismantle the bag, the procedure is simply reversed. The bag may then be folded into a relatively small bundle, tied and stored for future use.

In some instances it may be desirable to support the bag above the soil to permit rapid unloading of the bag contents by a funneling action. This may be useful for ease in feeding livestock. For this purpose a generally circular stand such as shown in Fig. 12 may be provided. This stand is constituted by twelve identical triangular sections 46 (six being shown) forming the sectors of a polygon. The sections are each elevated and supported at an incline by vertical legs 47 and 48, so that the stand assumes the shape of a large funnel. The apex of each section is cut to form a central opening 49. The grain storage bag to be mounted on the elevated stand may be similar in all its essential details to that shown in Fig. 1, save that the floor 10, as shown in Fig. 14, is provided centrally with a downwardly projecting tube 50 which extends through the central opening 49 of the stand, the upper end of the tube being outwardly flanged and being secured to the floor by means such as bolts 51. Interposed between the flange of tube 50 and floor 10 is an annular reinforcing member 52.

To control the flow of grain from the bag, the tube is provided with a gate constituted by a housing 53 and a gate element 54 slidable therein, the gate element being provided with a handle 55 to permit adjustment thereof. Lever means may alternatively be provided to effect adjustment of the gate. As shown in Fig. 15, the gate element is also provided with a plurality of screen vents 56. In view of the center outlet in the floor of the bag, the internal support for the bag may take a tripod form rather than the single center post. The legs of the stand may be provided with rodent or termite shields.

While a zipper opening has been disclosed providing access through a slit in the roof portion of the bag, the zipper may alternatively be designed to open a relatively large flap in the bag so that entry therein is facilitated. In the event the bag is ripped or otherwise damaged, a patch of the same material may be used to cover the damaged area. This patch, in the case of a vinyl-coated fabric may be applied with an acetone base cement, and in the case of a neoprene-coated fabric with rubber cement.

While there has been shown what at present are considered to be preferred embodiments of the invention, it will be evident that many changes and modifications may be made therein without departing from the essential spirit of the invention. It is intended, therefore, in the appended claims to cover all such changes and modifications as fall within the true spirit of the invention.

What is claimed is:

1. A grain storage bag comprising a floor portion, an annular gusset portion secured at its lower edge to the periphery of said floor portion, an upright truncated pyramidal roof portion secured at its base to the upper edge of said gusset portion and having a mouth at the peak thereof, and a chimney portion secured to the mouth of said roof portion and projecting thereabove, said roof portion having a slope slightly greater than the angle of repose of the grain to be stored, said gusset portion being upwardly tapered whereby when the bag is loaded it assumes a more vertical position to hold the roof portion taut, a bag supporting post extending from the center of said floor portion to said chimney, and means coupling the upper end of said post to said mouth of the roof portion, said portions all being formed of flexible material constituted by a base fabric coated on either side with a flexible plastic material incorporating a rodent repellent.

2. A grain storage bag, as set forth in claim 1, wherein said roof portion has a slope of approximately 35 degrees.

3. A grain storage bag comprising a floor portion, an annular gusset portion secured at its lower edge to the periphery of said floor portion, an upright truncated pyramidal roof portion secured at its base to the upper edge of said gusset portion and having a mouth formed at the peak thereof, and a chimney portion secured to the mouth of said roof portion and projecting thereabove, said roof portion having a slope corresponding substantially to the angle of repose of the grain to be stored, said portions all being formed of a flexible material constituted by a woven base fabric formed of an inorganic substance and coated on both sides with a flexible waterproof plastic, a bag supporting post extending from the center of said floor portion to said chimney portion, and means coupling the upper end of said post to said mouth of said roof portion.

4. A grain storage bag comprising a floor portion having a circular configuration, an upwardly tapered annular gusset portion secured at its lower edge to the periphery of said floor portion, an upright truncated pyramidal roof portion secured at its base to the upper edge of said gusset portion and having a mouth formed at the peak thereof, and a chimney portion secured to the mouth of said roof portion and projecting thereabove, said gusset portion having screened side vents formed therein, said roof portion having a slope of approximately 35 degrees, said portions all being formed of a flexible material constituted by a base fabric formed of an inorganic substance and coated on either side with a flexible plastic, a bag supporting post extending from the center of said floor portion to said chimney, and means coupling the upper end of said post to said mouth of said roof portion.

5. A grain storage bag comprising a floor portion having a circular configuration, an upwardly tapered gusset portion secured at its lower edge to the periphery of said floor portion, an upright truncated pyramidal roof portion secured at its base to the upper edge of said gusset portion and having a mouth formed at the peak thereof, a chimney portion secured to the mouth of said roof portion and projecting thereabove, said gusset portion having screened side vents formed therein, said roof portion having a slope corresponding substantially to the angle of repose of the grain to be stored, an openable snout extending laterally from said roof portion, a zippered opening in said roof portion, and said flap means to protect said opening; said portions, said snout and said flap means being formed of an inorganic woven fabric which is vinylcoated on both sides, a bag supporting post extending from the center of said floor portion to said chimney, and means coupling the upper end of said post to said mouth of said roof portion.

6. A grain storage bag comprising a floor portion, an upwardly tapered annular gusset portion secured at its lower edge to the periphery of said floor portion, an upright truncated pyramidal roof portion secured at its base to the upper edge of said gusset portion and having a mouth formed at the peak thereof, a chimney portion secured to the mouth of said roof portion and projecting thereabove, said roof portion having a slope corresponding substantially to the angle of repose of the grain to be stored, the exposed surface of said bag having a light reflective coating thereon, the inner surface of said bag having a heat absorbing coating thereon, a bag supporting post extending from the center of said floor portion to said chimney, and means coupling the upper end of said post to said mouth of said roof portion, said portions all being formed of flexible material constituted by a base fabric coated on either side with a flexible plastic material incorporating a rodent repellent.

7. A grain storage bag comprising a floor portion, an upwardly tapered annular gusset portion secured at its lower edge to the periphery of said floor portion, an upright truncated pyramidal roof portion secured at its base to the upper edge of said gusset portion and having a mouth formed at the peak thereof, a chimney portion secured to the mouth of said roof portion and projecting thereabove, said roof portion having a slope corresponding substantially to the angle of repose of the grain to be stored, said portions all being formed of a material constituted by a woven fabric formed of an inorganic substance and coated on either side with a flexible plastic material incorporating a rodent repellent, a bag supporting post extending from the center of said floor portion to said chimney, and means coupling the upper end of said post to said mouth of said roof portion.

8. A grain storage bag comprising a floor portion, an upwardly tapered annular gusset portion secured at its lower edge to the periphery of said floor portion, screened side vents in said gusset portion, an upright truncated-pyramidal roof portion secured at its base to the upper edge of said gusset portion and having a mouth formed at the peak thereof, a chimney portion secured to the mouth of said roof portion and projecting thereabove, said roof portion having a slope corresponding substantially to the angle of repose of the grain to be stored, a central post for supporting said bag, said post extending from the center of said floor portion to said chimney, and a resilient coupling between said mouth of said roof portion and the upper end of said post, said portions all being formed of flexible material constituted by a base fabric coated on either side with a flexible plastic material incorporating a rodent repellent.

9. A bag as set forth in claim 8, wherein said post has a longitudinally extending hollow portion adapted to ventilate the core of the grain bulk in said bag.

10. A grain storage structure comprising a floor portion having a circular configuration, an upwardly-tapered cylindrical gusset portion secured continuously at its lower edge to the periphery of said floor portion to prevent entry of animals in said structure, said gusset portion being provided with a plurality of screened vent openings circumferentially arranged at spaced positions, an upright truncated-pyramidal roof portion secured at its base to the upper edge of said gusset portion, said roof portion having a mouth at the peak thereof and having a slope of approximately 35 degrees, a zippered opening in said roof portion extending the length thereof, a chimney portion secured to the mouth of said roof portion and projecting thereabove, said portions being fabricated of woven nylon fabric vinyl-coated on either side, said coatings including a rodent repellent, said outer coating being light reflective, said inner coating being heat absorbing, a supporting post extending vertically from the center of said floor portion, a socket resiliently supported in said mouth of the roof portion and engaging the upper end of said post, said post having a hollow portion extending longitudinally therein, and a ventilating cap removably received within said chimney.

References Cited in the file of this patent

UNITED STATES PATENTS

| | | |
|---|---|---|
| 412,161 | Burrell | Oct. 1, 1889 |
| 428,697 | Rumrille | May 27, 1890 |
| 1,319,267 | Brown | Oct. 21, 1919 |
| 1,500,610 | Dodds | July 8, 1924 |
| 2,027,268 | Davis | Jan. 7, 1936 |
| 2,439,853 | Moffett | Apr. 20, 1948 |
| 2,504,213 | Meyer | Apr. 18, 1950 |
| 2,646,057 | Blanchard | July 21, 1953 |
| 2,704,501 | Rysdon | Mar. 22, 1955 |
| 2,720,825 | Noel | Oct. 15, 1955 |